(12) United States Patent
Bontu et al.

(10) Patent No.: US 6,463,073 B1
(45) Date of Patent: Oct. 8, 2002

(54) SLOT STRUCTURE AND METHOD OF POWER CONTROL FOR USE IN A TDMA NETWORK

(75) Inventors: Chandra S. Bontu; Shavantha Kularatna, both of Nepean; Shamim A. Rahman, Ottawa, all of (CA); Yonghai Gu, Redmond, WA (US); Peter Barany, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/216,993

(22) Filed: Dec. 21, 1998

(51) Int. Cl.[7] ................................................ H04B 7/212
(52) U.S. Cl. .................. 370/442; 370/336; 370/337; 370/347; 370/444; 370/458; 370/459; 375/308; 455/69; 455/522
(58) Field of Search ................................. 370/336–337, 370/347, 442, 503–520, 328–329, 252, 318; 375/308; 455/69, 522

(56) References Cited

U.S. PATENT DOCUMENTS

| 5,444,696 A |   | 8/1995 | Petranovich ................. 370/17 |
| 5,583,870 A |   | 12/1996 | Delprat et al. .............. 370/337 |
| 5,726,981 A | * | 3/1998 | Ylitervo ..................... 370/332 |
| 5,751,731 A | * | 5/1998 | Raith ....................... 371/37.01 |
| 5,757,813 A | * | 5/1998 | Raith ......................... 371/5.5 |
| 6,081,514 A | * | 6/2000 | Raith ......................... 370/321 |
| 6,175,745 B1 | * | 1/2001 | Bringby et al. ............. 455/522 |

OTHER PUBLICATIONS

Asha Mehrotra, Cellular Radio/Analog and Digital System, Artech House, Inc., 1994, p. 308–327.*
GSM04.22, Digital cellular telecommunication system (phase 2+), ETSI, Dec. 1995, p. 9–19.*

* cited by examiner

Primary Examiner—Douglas Olms
Assistant Examiner—Van Nguyen

(57) ABSTRACT

The invention is a novel slot structure and method of transmitting data at a controllable power level. The slot comprises a header, a DATA field adjacent the header and a ramp interval adjacent the DATA field. The method consists of transmitting the entire slot at a sufficiently high power when the DATA field is occupied by data traffic or control information but to lower the power during transmission of the DATA field when the slot is a null slot. In the latter case, a gradual decrease of the transmitted power is effected during the first few symbols of the DATA field, whereas the power is brought back to a higher level during the ramp interval. The new power level may be higher or lower than the initial power level, depending on the destination mobile unit associated with the following slot.

25 Claims, 2 Drawing Sheets

SLOT STRUCTURE AND METHOD OF POWER CONTROL FOR USE IN A TDMA NETWORK

FIELD OF THE INVENTION

The present invention relates to cellular communications networks and, in particular, to a novel downlink slot structure and method of power control for use in a TDMA packet data network.

BACKGROUND OF THE INVENTION

In order to enable multiple users of a cellular network to share the same geographic region, or "cell", a time-division multiple-access (TDMA) standard was developed by members of the Telecommunications Industries Association, which standard came to be known as IS-136 and which is incorporated by reference herein. According to IS-136, time is divided into frames of 40 milliseconds (ms) and each frame is further divided into slots of 6.67 ms each. In the version of IS-136 currently implemented by most wireless service providers, a circuit is established between a base station and a mobile unit by using two or more slots out of each frame.

This circuit-switched characteristic of most current IS-136-compliant cellular systems works well when the only type of information to be communicated is voice information and when bandwidth is abundant. However, a growing number of communications applications currently in use today involve the transfer of data packets, common examples being Web browsing, file transfers, electronic commerce and electronic mail. As opposed to voice exchanges, packet transfers are sporadic, asynchronous and have varying bandwidth demands. It is therefore highly inefficient to establish a dedicated circuit for channelling a packet transfer between a base station and a mobile unit when the circuit may service the occasional data burst but otherwise remains idle.

Thus, it would be desirable to apply the TDMA concept to a packet-based architecture, although without excessively deviating from the current TDMA standard. To this end, members of the TIA are in the process of developing a new TDMA standard, known as GPRS-136. GPRS-136 is a packet delivery service that is essentially based on the GPRS (general packet radio service) protocol as defined by the ETSI (European Telecommunnications Standards Institute) but specifically adapted to operate on an IS-136 air interface. Therefore, GPRS-136 continues to provide slots of 6.67 ms and frames of 6 slots each, as in conventional IS-136.

Nevertheless, while certain similarities between GPRS-136 and IS-136 are present for reasons of compatibility, GPRS-136 also allows the configuration of new slot structures which differ significantly from the traditional IS-136 model. This permits the design of slot structures that counter various disadvantages of current TDMA systems which are compounded by the packet-based nature of today's traffic mix, while remaining within the broad scope of the accepted IS-136 air interface standard.

For instance, co-channel interference is a phenomenon known to affect a mobile unit when it enters a geographic region in which the signals from multiple base stations are strong enough to interfere with each other. In a packet-based system, out of the many mobile units communicating with base stations that contribute to the co-channel interference, it is likely that one or more will be idle and will not require the transmission of packets at any given time instant. Co-channel interference could therefore conceivably be mitigated by reducing the power emitted by a base station while in communication with idle mobile units.

However, if the current IS-136 slot structure and in particular the digital control channel (or DCCH) were adopted for packet transmission, it would be extremely impractical to achieve a reduction in co-channel interference. The reason for this is that the DCCH slot structure contains control fields that are distributed among the data fields of the slot, but these same control fields comprise information that must be properly received by the mobile unit, even if the data fields contain no valid data, e.g., when the mobile unit is idle.

Thus, a base station wishing to reduce co-channel interference should execute fast and frequent power ramps to keep the transmitted power at a high level for the control fields, while possibly lowering the power during the (fragmented) data fields of the slot. Unfortunately, an ordinary base station transmitter cannot provide such rapid variations in output power as are called for by the nature of the currently used IS-136 slot structure.

Clearly, there is a need for a new slot structure which is better suited to a packet-switched communications architecture and, specifically, which possesses advantageous properties to allow the transmitted power to be reduced during the transmission of null slots, thereby to reduce co-channel interference.

SUMMARY OF THE INVENTION

It is an object of the present invention to mitigate or obviate one or more disadvantages of the prior art.

Therefore, in accordance with a first broad aspect, the invention provides a novel slot structure for use in a TDMA communications system. The slot comprises a header, a data field adjacent the header and a ramp interval adjacent the data field.

The invention may be summarized according to another broad aspect as a method of transmitting data at a controllable power level. The method comprises arranging the data into slots having the just described structure and then choosing one of two power curves for transmitting a given slot. If the slot is a null slot, then the header is sent at a high power and the power is ramped down to a low power during the first few symbols of the data field. The remainder of the data field is transmitted at this low power until the power is ramped back up again during the ramp interval.

Because the header is separate from the data field, it becomes practical to implement the power control mechanism using currently available base station transmitters, with the result that power is conserved at the base station transmitter and co-channel interference is mitigated.

BRIEF DESCRIPTION OF THE DRAWINGS

The preferred embodiment of the present invention will now be described with reference to the following figures, in which.

DETAILED DESCRIPTION OF THE PREFERRED EMBODIMENT

The present invention is partly described in TIA contribution TR45.3.5/98.07.15R2, incorporated by reference herein, which proposes a novel format for a physical layer packet data slot for both the uplink (mobile unit to base station) and the downlink (base station to mobile unit); the invention described herein is directed specifically to the downlink slot structure.

Figure 1:
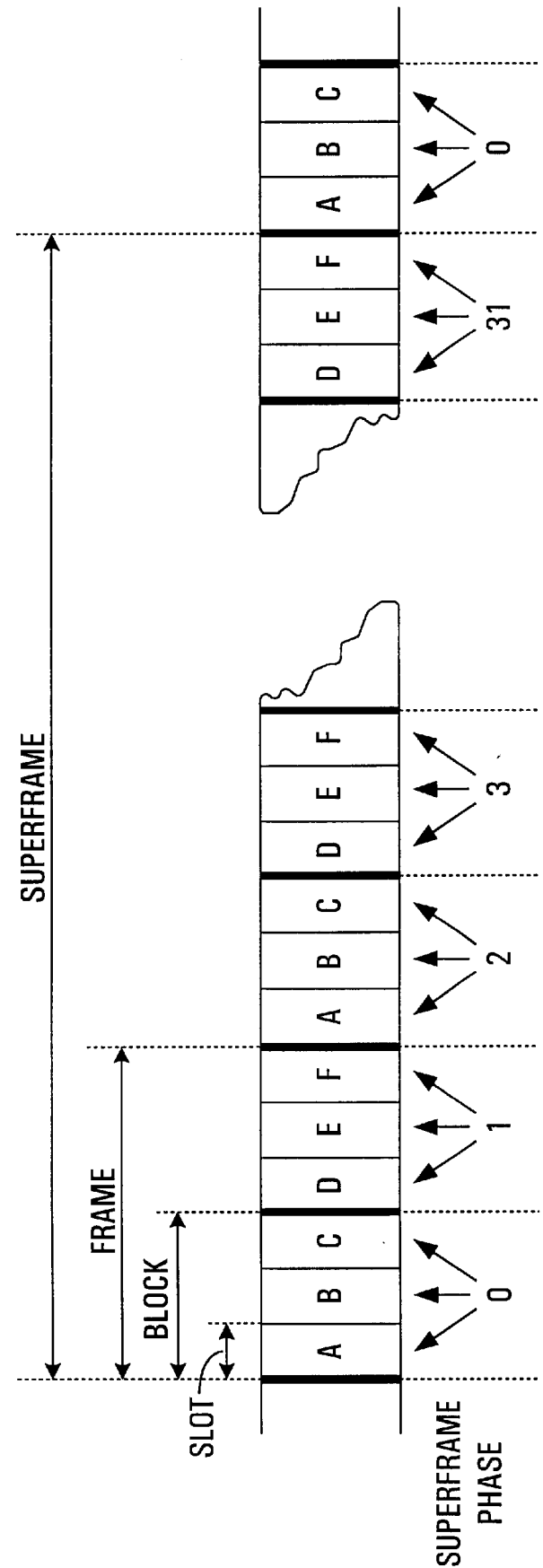
FIG. 1 illustrates a sequence of frames containing slots grouped into TDMA blocks associated with respective superframe phases.

Referring to FIG. 1, there is depicted a sequence of frames, each consisting of six inventive slots as will be described in further detail hereinbelow. For each frame, the slots are identified as A, B, C, D, E and F. The triplet of slots A, B and C and the triplet of slots D, E and F each forms what is known to persons skilled in the art as a TDMA block.

The use of a single slot per TDMA block to transmit a packet-based service to one or more mobile units defines what may be termed a "full-rate" forward packet channel (FPCH). However, depending on the bandwidth required by the packet-based service, it may be desirable to use two or all three slots per TDMA block in the case of a "double-rate" or "triple-rate" FPCH, respectively.

Associated with each TDMA block is a so-called "superframe phase" between 0 and 31, which serves to identify the position of the TDMA block within a larger number of blocks forming a superframe. This preliminary discussion relating to superframes and superframe phases will prove useful later on when examining the contents of a specific field within the inventive slot structure.

Figure 2A:
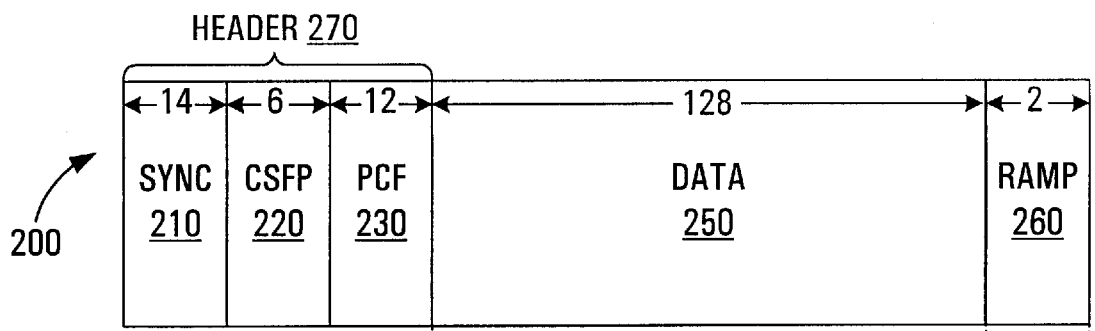
FIG. 2A shows the structure of a slot in accordance with the preferred embodiment of the present invention.

Referring now to FIG. 2A, there is shown a downlink slot 200 having a structure in accordance with the preferred embodiment of the present invention. The inventive slot 200 preferably has a length of 162 symbols and is broken down into a fourteen-symbol SYNC field 210, a six-symbol coded superframe phase (CSFP) field 220, a twelve-symbol packet channel feedback (PCF) field 230, a 128-symbol DATA field 250 and a ramp interval 260 having a length of two symbol intervals. In order to remain within the realm of IS-136, the slot 200 preferably has a total duration of 6.67 milliseconds (ms).

The ramp interval 260 affords a transition period between the DATA field 250 and the header of the subsequent slot in a sequence of slots such as that shown in FIG. 1. The ramp interval 260 need not be modulated according to any particular scheme since it contains neither data nor control information. While the ramp interval 260 is preferably two symbols in duration, it may span any suitable integer number of symbols.

Digital modulation is used for modulating each symbol in the header 270 (consisting of the SYNC, CSFP and PCF fields) and in the DATA field 250. In the preferred embodiment of the present invention, the header 270 is modulated using π/4-shifted differential quaternary phase shift keying (π/4-DQPSK), while the modulation scheme used for the symbols in the DATA field 250 is selected to be either π/4-DQPSK or octonary PSK (8-PSK). The selected modulation scheme used for the DATA field 250 is indicated in the CSFP field 220, to be described later in further detail.

If π/4-DQPSK is used for modulating the DATA field 250, then there are two bits of information per symbol while in the case of 8-PSK the number of bits per symbol is three. Depending on the modulation scheme, therefore, the DATA field 250 may carry either 256 bits (if π/4-DQPSK is used) or 384 bits (when 8-PSK is employed). Since 8-PSK is more prone to errors than is π/4-DQPSK, an acceptable error rate for 8-PSK can be maintained by preferably inserting pilot fields within the DATA field 250.

Figure 3:
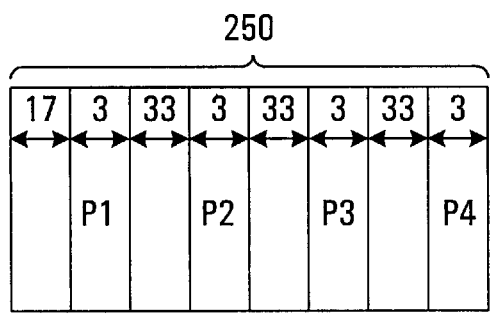
FIG. 3 depicts the detailed structure of the DATA field in the slot of FIG. 2A when modulated using 8-PSK.

Reference is now made to FIG. 3, which specifically depicts the DATA field 250 when it is modulated using 8-PSK, consisting of a first three-symbol pilot field P1 placed 17 symbols after the start of the DATA field 250, a second three-symbol pilot field P2 located 33 symbols after pilot field P1, a third three-symbol pilot field P3 found 33 symbols after pilot field P2 and a fourth three-symbol pilot field P4 at the edge of the DATA field 250, separated from pilot field P3 by 33 symbols. While detection accuracy and synchronization is enhanced by the presence of four evenly spaced pilot fields of known value, the number of available data bits in the DATA field 250 is reduced to 348 from the previously mentioned 384.

Although the DATA field 250 usually carries only genuine data traffic (in which case the FPCH is known as a packet traffic channel—PTCH), the DATA field 250 may also be used to carry control information some of the time and data traffic the rest of the time (in which case the FPCH is known as a packet control channel—PCCH). In either case, the slot structure of FIG. 2A remains unchanged.

With continued reference to FIG. 2A, the 14 symbols contained in the SYNC field 210 form one of a number of known combinations, thereby to identify the slot position within a frame and hence to enable accurate timing and carrier recovery at the mobile unit. The SYNC field 210 must be accurately received at the mobile unit and therefore it must always be transmitted at a sufficiently high power by the base station.

Likewise, the CSFP field 220 is also crucial and must be transmitted at a sufficiently high power to be received with accuracy by the mobile unit. As mentioned above, a first purpose of the CSFP field 220 is to indicate the modulation scheme used to modulate the DATA field 250. In addition, as suggested by its acronym, the CSFP field 220 also serves to identify the superframe phase, discussed above, associated with the contents of the DATA field 250.

A third purpose of the CSFP field 220 in the time slot is to specify whether the data in the DATA field of the slot is in an incremental redundancy mode or in a fixed coding mode. This allows ficed coded slots to be interspersed between incremental redundancy slots.

Preferably, the CSFP field 220 is encoded using a bit pattern that allows facilitated error detection and correction by the mobile unit, most preferably a shortened Hamming code with inverted parity bits. Also, it is a desirable feature of the CSFP field 220 that it be located after and adjacent the SYNC field 210, since correct detection of the SYNC symbols at the mobile unit will increase the probability of correct detection of the CSFP symbols in the presence of strong multipath propagation through the air interface.

Finally, the PCF field 230 is an optional control field and contains control information which is used in support of reservation- or contention-based access channel operation. For instance, the PCF field 230 may indicate to a mobile unit the identity of the next slot which is destined for that mobile unit. If it is used, the PCF field must be transmitted at sufficient power to be accurately received by the mobile unit or units for which the slot is destined.

Due to the arrangement of the control fields as a contiguous header 270 separate from the DATA field 250 and to the presence of the ramp interval 260 after the DATA field 250, reduction of co-channel interference during pauses becomes feasible because the power curve to be applied by an ordinary base station transmitter is drastically simplified. Specifically, FIG. 2B shows a power curve 280 of the instantaneous transmitted base station power to be applied in the case where the information in the DATA field 250 is a legitimate burst of data or control information, while FIG. 2C shows a power curve 290 corresponding to the case where the information in the DATA field 250 is a pause, i.e., when the slot 200 is a null slot.

Figure 2B:
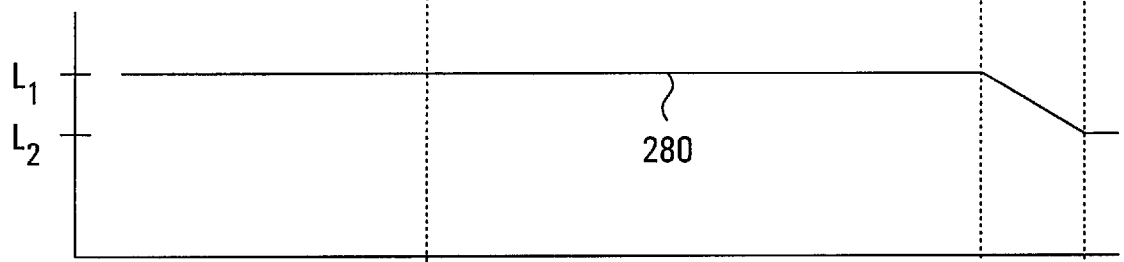
FIG. 2B shows variations in the instantaneous power level emitted by a base station transmitter when the DATA field in the slot of FIG. 2A contains a data burst.

In FIG. 2B, power curve 280 is seen to be at a relatively high level $L_1$ during the header 270 of the slot 200, thus enabling the mobile unit to properly receive the control information in the SYNC field 210, the CSFP field 220 and the optional PCF field 230. Level $L_1$ can either be the maximum output power level of the base station transmitter or, in a more sophisticated system, level $L_1$ may be the power level just high enough to keep the bit error rate below a certain threshold value. It is noted that the emitted base station power remains at level $L_1$ throughout the DATA field 250, since the DATA field in this case contains a burst which, just like the information in the header 270, must be received with low probability of error by the mobile unit.

Continuing along power curve 280, the power level is decreased during the ramp interval 260 until it reaches a level $L_2$ at the beginning of the next slot. Of course, the slot immediately following slot 200 may be destined for a different mobile unit which may be closer to (or further from) the base station than the first mobile unit, and therefore the power level $L_2$ required to yield a sufficiently low bit error rate may be lower, higher or the same as level $L_1$.

Figure 2C:
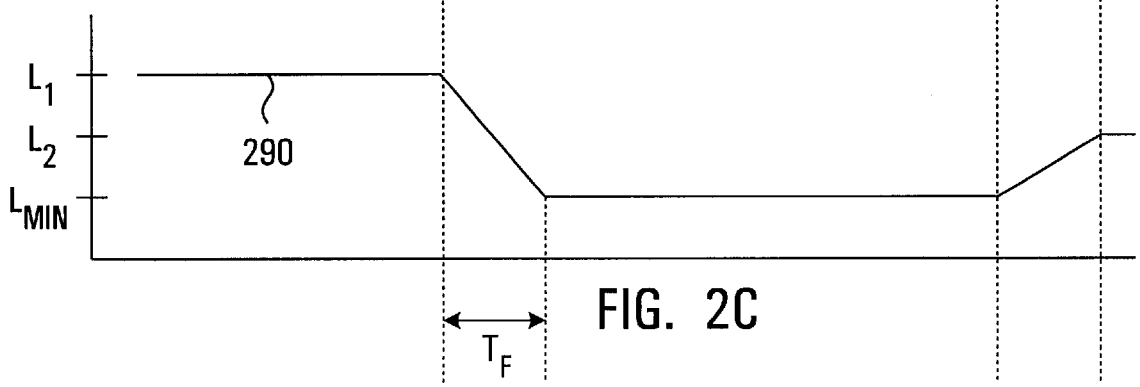
FIG. 2C shows variations in the instantaneous power level emitted by a base station transmitter when the DATA field in the slot of FIG. 2A contains a pause between bursts of data.

In FIG. 2C, power curve 290 similarly begins at a relatively high level $L_1$, but remains at this level only during the header portion 270 of slot 200. In this case, the information in the DATA field 250 is a pause, i.e., the slot 200 is a null slot, and therefore the transmitted power is allowed to be significantly reduced during the DATA field 250. Accordingly, the power curve is seen to drop from level $L_1$ to level $L_{MIN}$, preferably several decibels below level $L_1$, during the time span $T_F$ immediately following the header 270.

The "fall interval" $T_F$ is implementation-dependent and preferably spans the duration of one to three symbol intervals. Although the power curve 290 is shown to behave in a linear fashion during the fall interval $T_F$, it should be understood that the exact trajectory followed while dropping to level $L_{MIN}$ is not limited to this type of linear behaviour.

Still with reference to FIG. 2C, the emitted base station power remains at level $L_{MIN}$ until the ramp interval 260, at which point the power curve 290 is seen to rise to level $L_2$. Again, depending on the destination of the next slot and as explained with reference to FIG. 2B, level $L_2$ may be higher or lower than level $L_1$. It is to be understood that the shape of the power curve 290 during the ramp interval 260 need not be linear and may have smoother or sharper edges.

It is noted from FIG. 2C that the base station transmitter is made to function in what may be termed as "quasi-discontinuous transmission" (Q-DTX) mode when transmitting a null slot. This leads to considerable power savings at the base station transmitter and advantageously reduces the amount of co-channel interference induced in the signals received by mobile units inside and outside the corresponding cell.

While the preferred embodiment of the present invention has been described and illustrated, it will be apparent to one skilled in the art that numerous modifications and variations are possible. For example, a different number of symbols may populate the SYNC, CSFP, PCF, DATA and pilot fields and the ramp interval 260 may be of a different duration. Also, as indicated, it is possible for the DATA field to transport control information in addition to data per se. Finally, modulation schemes other than π/4-DQPSK or 8-PSK may be used by the base station to encode the symbols in the various fields of the inventive slot.

In view of the many further conceivable variations of the present invention, its scope is only to be limited by the claims appended hereto.

We claim:

1. A method for transmitting a downlink data signal embodied in a carrier wave, comprising a slot structure for use in a time-division multiple-access (TDMA) communication system in which a base station communicates with a plurality of mobile units at a controllable power level using null and non-null slots, said slot structure including:
   a) a header;
   b) a data field adjacent the header; and
   c) a ramp interval adjacent the data field;
   wherein:
      a) when a slot is a null slot:
         i) the header is transmitted at a first power level;
         ii) the power level is reduced during the beginning of the data field;
         iii) the remainder of the data field is transmitted at a second power level lower than the first power level; and
         iv) the power level is increased during the ramp interval; and
      b) when a slot is a non-null slot, the entire slot is transmitted at the first power level.

2. A method for transmitting a downlink data signal according to claim 1, wherein the header is embodied in the carrier wave with a π/4 differential quaternary phase shift keying (π/4-DQPSK) modulation.

3. A method for transmitting a downlink data signal according to claim 1, wherein the data field is embodied in the carrier wave with a π/4 differential quaternary phase shift keying (π/4-DQPSK) modulation.

4. A method for transmitting a downlink data signal according to claim 1, wherein the data field is embodied in the carrier wave with an octonary phase shift keying (8-PSK) modulation.

5. A method for transmitting a downlink data signal according to claim 4, wherein the data field comprises at least one pilot field containing a known sequence of symbols for carrier and timing recovery at the mobile unit.

6. A method for transmitting a downlink data signal according to claim 1, wherein the header comprises a SYNC field for identifying a specific mobile unit for which the slot is destined.

7. A method for transmitting a downlink data signal according to claim 6, wherein the SYNC field is fourteen symbols in length.

8. A method for transmitting a downlink data signal according to claim 1, wherein each slot is associated with a superframe phase and wherein the header comprises a coded superframe phase (CSFP) field indicative of the associated superframe phase.

9. A method for transmitting a downlink data signal according to claim 8, wherein:
   a) the header is embodied in the carrier wave with a π/4 differential quaternary phase shift keying (π/4-DQPSK) modulation;
   b) the data field is embodied in the carrier wave with a modulation type selected from the group including π/4-DQPSK modulation and octonary phase shift keying (8-PSK) modulation; and c) the CSFP field indicates the modulation type.

10. A method for transmitting a downlink data signal according to claim 8, wherein the CSFP field indicates whether the contents of the data field is in an incremental redundancy mode or in a fixed coding mode.

11. A method for transmitting a downlink data signal according to claim 9, wherein the CSFP field further indicates whether the contents of the data field is in an incremental redundancy mode or in a fixed coding mode.

12. A method for transmitting a downlink data signal according to claim 8, wherein the header further comprises a SYNC field for identifying a specific mobile unit for which the slot is destined and wherein the CSFP field is located after and adjacent the SYNC field.

13. A method for transmitting a downlink data signal according to claim 9, wherein the header further comprises a SYNC field for identifying a specific mobile unit for which the slot is destined and wherein the CSFP field is located after and adjacent the SYNC field.

14. A method for transmitting a downlink data signal according to claim 10, wherein the header further comprises a SYNC field for identifying a specific mobile unit for which the slot is destined and wherein the CSFP field is located after and adjacent the SYNC field.

15. A method for transmitting a downlink data signal according to claim 11, wherein the header further comprises a SYNC field for identifying a specific mobile unit for which the slot is destined and wherein the CSFP field is located after and adjacent the SYNC field.

16. A method for transmitting a downlink data signal according to claim 8, wherein the CSFP field is six symbols in length.

17. A method for transmitting a downlink data signal according to claim 8, wherein the CSFP field is encoded using a shortened Hamming code with inverted parity bits.

18. A method for transmitting a downlink data signal according to claim 1, wherein the ramp interval has a duration of 2 symbol periods.

19. A method for transmitting a downlink data signal according to claim 1, wherein the header comprises a packet channel feedback (PCF) field for supporting reservation or contention-based access channel operation.

20. A method for transmitting a downlink data signal according to claim 19, wherein the PCF field is twelve symbols in length.

21. A method for transmitting a downlink data signal according to claim 1 wherein each slot has a duration of 6.67 milliseconds.

22. In a time-division multiple-access (TDMA) communications system wherein a base station communicates with multiple mobile units, a method of transmitting data from the base station to the mobile units at a controllable power level, comprising the steps of:

arranging the data into slots, each slot having a header, a data field adjacent the header and a ramp interval adjacent the data field;

for each slot, determining whether the slot is a null slot and if so, transmitting the header at a first power level, reducing the power level during the beginning of the data field, transmitting the remainder of the data field at a second power level lower than the first power level and increasing the power level during the ramp interval; otherwise, transmitting the entire slot at the first power level.

23. A method according to claim 22, wherein the power level reached after increasing during the ramp interval is equal to the first power level.

24. A method according to claim 23, wherein the power level reached after increasing during the ramp interval is dependent on the destination mobile unit associated with the subsequent slot.

25. A base station for use in a time-division multiple-access (TDMA) communications system and for transmitting data at a controllable power level to a plurality of mobile units, comprising:

means for arranging the data into slots, each slot having a header, a data field adjacent the header and a ramp interval adjacent the data field;

means for determining, for each slot, whether the slot is a null slot and if so, transmitting the header at a first power level, reducing the power level during the beginning of the data field, transmitting the remainder of the data field at a second power level lower than the first power level and increasing the power level during the ramp interval; otherwise, transmitting the entire slot at the first power level.

* * * * *